United States Patent
Hernandez Porras et al.

(10) Patent No.: US 8,826,253 B2
(45) Date of Patent: Sep. 2, 2014

(54) DELAYED INSERTION OF SAFEPOINT-RELATED CODE

(75) Inventors: Victor Leonel Hernandez Porras, San Francisco, CA (US); Roger Scott Hoover, Cheyenne, WY (US); Christopher Arthur Lattner, San Jose, CA (US); Thomas John O'Brien, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1101 days.

(21) Appl. No.: 12/316,729

(22) Filed: Dec. 15, 2008

(65) Prior Publication Data

US 2010/0153935 A1    Jun. 17, 2010

(51) Int. Cl.
*G06F 9/45* (2006.01)
*G06F 12/02* (2006.01)

(52) U.S. Cl.
CPC ............ *G06F 8/443* (2013.01); *G06F 12/0269* (2013.01)
USPC ........... 717/151; 717/152; 717/154; 717/155; 717/158

(58) Field of Classification Search
None
See application file for complete search history.

(56) References Cited

U.S. PATENT DOCUMENTS 7,831,961 B1 * 11/2010 Bush et al. .................... 717/124
8,078,854 B2 * 12/2011 Vick et al. .................... 712/244

OTHER PUBLICATIONS

Arnold et al. Adaptive optimization in the Jalapeno JVM. OOPSLA. ACM (2000).
Chambers et al., "An efficient implementation of SELF, a dynamically-typed object-oriented language based on prototypes." LISP & Symbolic Computation, pp. 243-281 (1991).
Chambers et al., "Making pure object-oriented languages practical." OOPSLA Conf. Proc. (Oct. 1991).
Fink et al., "Design, implementation and evaluation f adaptive recompilation with on-stack replacement." Proc. Int'l Symposium on Code Generation and Optimization: feedback-directed and runtime optimization, pp. 241-252 (2003).
Holzle, et al., "Debugging optimized code with dynamic deoptimization." ACM SIGPLAN Conf. on Programming Langauge Design & Implementation (Jun. 1992).
Soman et al., "Efficient and general on-stack replacement for aggressive program specialization." Int'l Conf. on Programming Languages & Compilers (Jun. 2006).
USENIX ASSN., "Proc. JAVA virtual machine research and technology symposium." (JVM) (Apr. 2001).

* cited by examiner

*Primary Examiner* — Qamrun Nahar
(74) *Attorney, Agent, or Firm* — Womble Carlyle Sandridge & Rice, LLP (57) ABSTRACT

Delayed insertion of safepoint related code is disclosed. Optimization processing is performed with respect to an intermediate representation of a source code. The optimized intermediate representation is analyzed programmatically to identify a safepoint and insert safepoint related code associated with the safepoint. In some embodiments, analyzing the optimized intermediate representation programmatically comprises determining where to place the safepoint within a program structure of the source code as reflected in the intermediate representation.

20 Claims, 6 Drawing Sheets

PRIOR ART

FIG. 1A

PRIOR ART

FIG. 1B

PRIOR ART

DELAYED INSERTION OF SAFEPOINT-RELATED CODE

BACKGROUND OF THE INVENTION

Figure 1A:
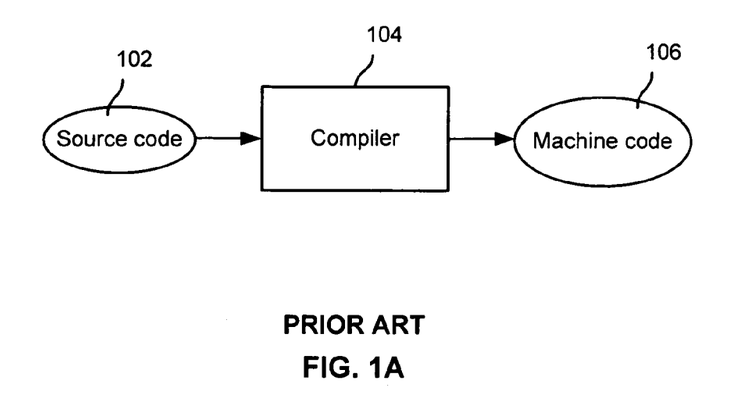
FIGS. 1A and 1B are block diagrams illustrating prior art systems for compiling source code, including source code in a traditionally interpreted programming language, such as JavaScript.
Figure 1B:
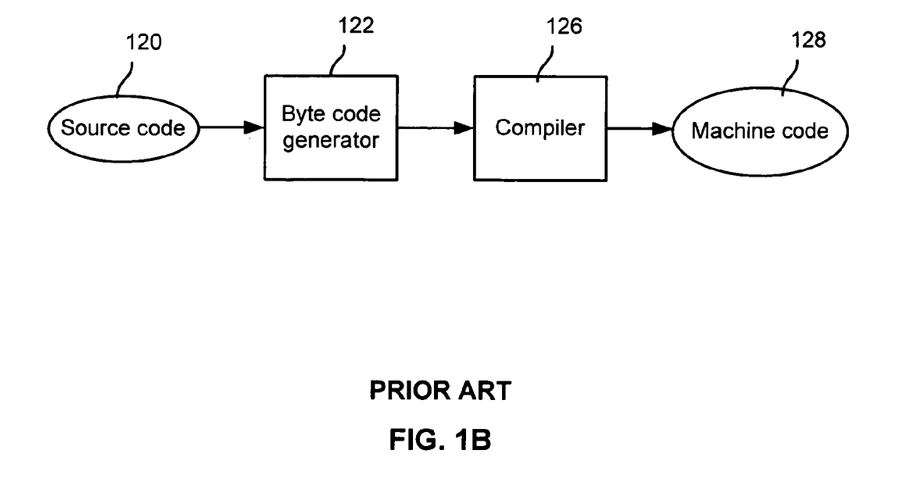

JavaScript or other traditionally interpreted code, or other source code, may be compiled into byte code or machine code for example to enable the compiled code to be executed in place of the original traditionally interpreted code, which typically affords performance advantages. FIGS. 1A and 1B are block diagrams illustrating prior art systems for compiling source code, including source code in a traditionally interpreted programming language, such as JavaScript. In the example shown in FIG. 1A, source code 102 is compiled by a compiler 104 to generate machine code 106. In the example shown in FIG. 1B, source code 122 is processed by an initial code generator 124 to generate an initial intermediate representation of the source code. Subsequently, a compiler 126 is used to perform optimization processing on the intermediate representation and to generate machine code 128 based on the optimized intermediate representation.

Figure 2:
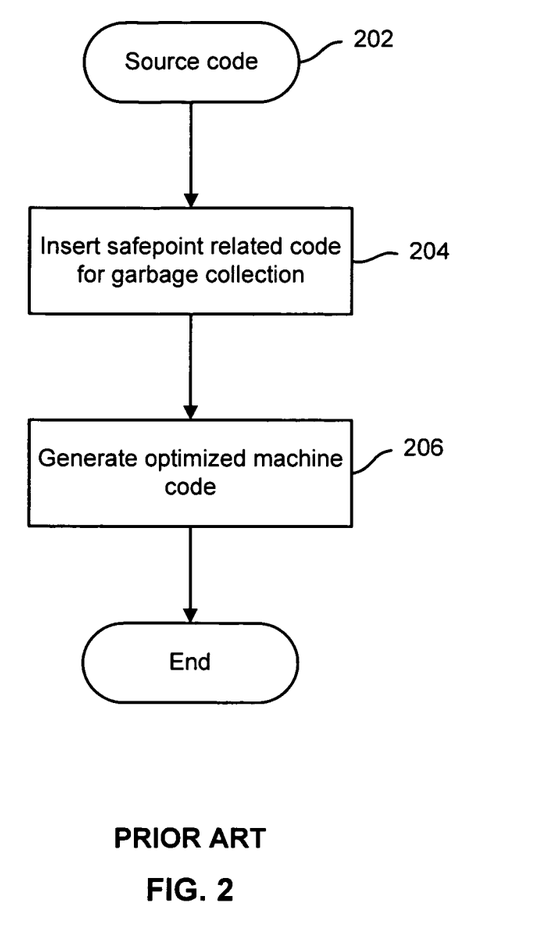
FIG. 2 is a flow diagram illustrating a prior art process for compiling source code.

There is a traditional approach used when compiling source code written in a traditionally interpreted or other language to generate machine code for execution in a garbage collected environment. This approach is to statically analyze the program structure of the source code to identify source code execution points where the requirements of garbage collection are satisfied. These requirements include the source code not allocating new objects and/or modifying existing objects. These requirements allow the garbage collector to safely update pointers in the case of a consolidating or "moving" garbage collector, and the execution points where these garbage collection operations can be done correctly may be referred to as "safepoints". The static analysis of the program structure results in safepoint code being inserted at these execution points in connection with initial code generation, i.e., the first stage of code generation based directly on the original source code, such as the initial byte code generated by byte code generator 124 in the example shown in FIG. 1B. Optimizations traditionally have been performed on such initially generated intermediate representation prior to final, optimized machine code being generated. FIG. 2 is a flow diagram illustrating a prior art process for compiling source code. In the example shown in FIG. 2, source code (202) is analyzed to identify points in the source code in which safepoint code can be inserted (204), e.g., in connection with initial code generation based on the source code. Subsequent to initial code generation, optimizations are performed and optimized machine code generated (206).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Deferred insertion of safepoint related code is disclosed. In some embodiments, when compiling JavaScript or other traditionally interpreted code, safepoint code is not inserted in connection with initial code generation. Instead, initial intermediate representation is generated without initially inserting safepoint code. The initial intermediate representation undergoes one or more stages of optimization processing, prior to safepoints being identified and associated safepoint code being inserted. In some embodiments, a program structure of the optimized intermediate representation is analyzed programmatically to determine execution points within in the program at which safepoints should be inserted, e.g., points at which one or more operations have been completed and data values and objects that point to data values are in known memory locations or known registers. In this way, optimizations that could not have been performed had safepoint related code been inserted in connection with initial code generation can be performed, and optimization processing does not result in any errors or inefficient code being generated by virtue of the safepoint related code having been inserted in connection with initial code generation.

Traditionally, compilers have inserted safepoint related code in connection with initial code generation based directly on a source code being compiled. During initial code generation, the original source code traditionally has been analyzed programmatically to determine based on a program structure of the code points at which safepoint related code should be inserted. In the traditional approach, optimization processing is performed on the initial intermediate representation, e.g., initial byte code, so generated. However, in some cases inserting safepoint related code in connection with initial code generation may prevent certain optimizations that could otherwise have been performed from being performed and/or safepoints being inserted at other than the most appropriate or advantageous points in the optimized intermediate representation and/or machine code generated based thereon.

Figure 3:
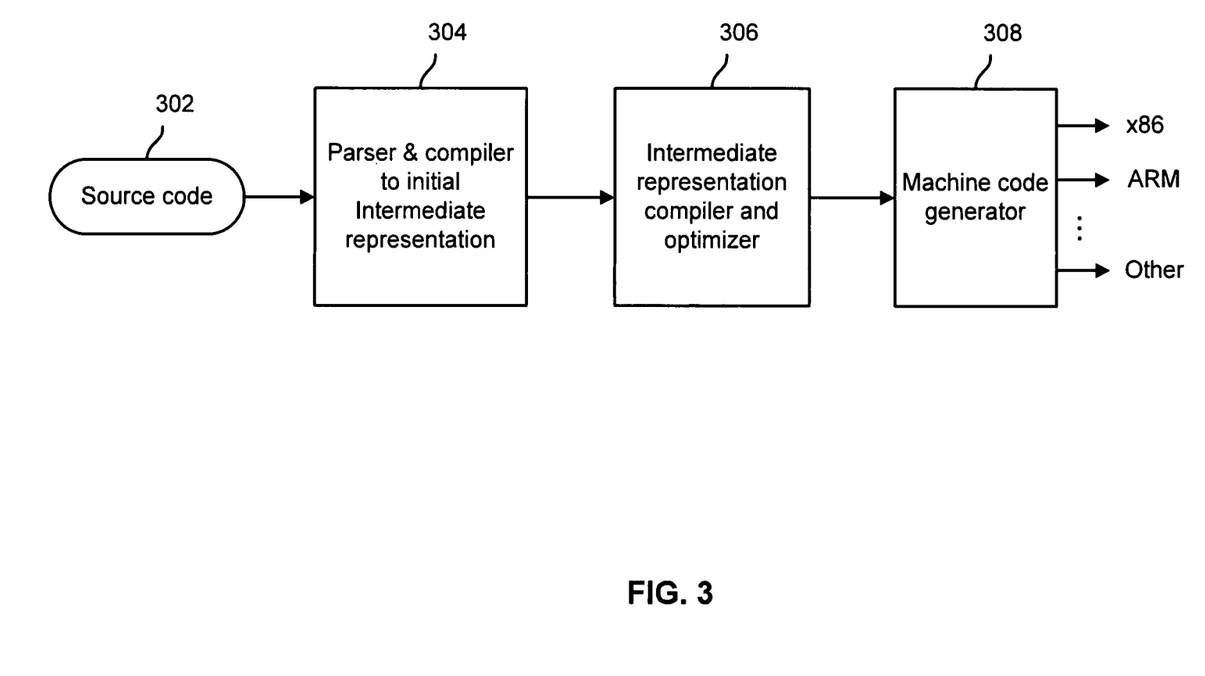
FIG. 3 is a block diagram illustrating an embodiment of a system for compiling source code.

FIG. 3 is a block diagram illustrating an embodiment of a system for compiling source code. In the example shown, source code 302, such as JavaScript or other code written in a traditionally interpreted programming language, or other source code that does not already include safepoint related code, is processed by a parser and initial code generator 304, which generates an initial intermediate representation based on the source code, without initially identifying safepoints and inserting safepoint related code. In some embodiments, the parser and initial code generator 304 generates byte code. The initially generated intermediate representation is provided to an optimization and second (and/or final) stage compiler 306 which generates an optimized intermediate representation of the source code, such as LLVM intermediate representation (IR) or another relatively low level representation of the intermediate representation. The LLVM IR or other representation is analyzed programmatically to identify safepoints based on that representation of the program structure of the code. In some embodiments, variable type information embodied in the LLVM IR is used to identify objects of a garbage collectible type and structures that point to such object. For each safepoint, safepoint related code is inserted into the LLVM IR. In various embodiments, the initially generated code is used to generate a relatively low level intermediate language that exposes, encodes, or otherwise reflects the program structure of the original source code to a sufficient degree to enable appropriate safepoints to be identified and safepoint related code inserted programmatically. A machine code generator 308 receives the optimized LLVM IR and generates device-appropriate machine code for one or more device and/or processor architectures.

Figure 4:
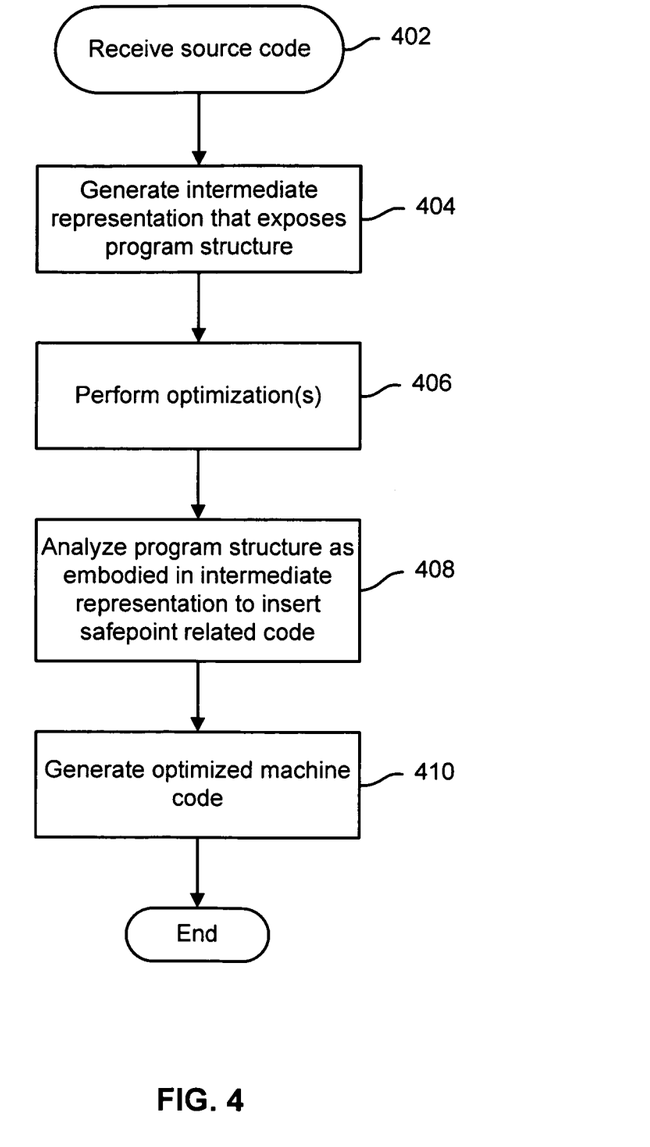
FIG. 4 is a flow diagram illustrating an embodiment of a process for compiling code.

FIG. 4 is a flow diagram illustrating an embodiment of a process for compiling code. In the example shown, received source code (402) is used to generate a relatively low level intermediate representation, such as LLVM IR, that reflects a program structure of the underlying source code in a manner that enables the structure to be analyzed programmatically, i.e., by automated processing of the LLVM IR, as required to identify safepoints and insert safepoint related code (404). One or more optimizations are performed (406). The optimized LLVM IR or other intermediate representation is processed to identify safepoints and safepoint related code is inserted (408). Once the safepoint related code has been inserted, the optimized intermediate representation is used to generate optimized machine code (410).

Figure 5:
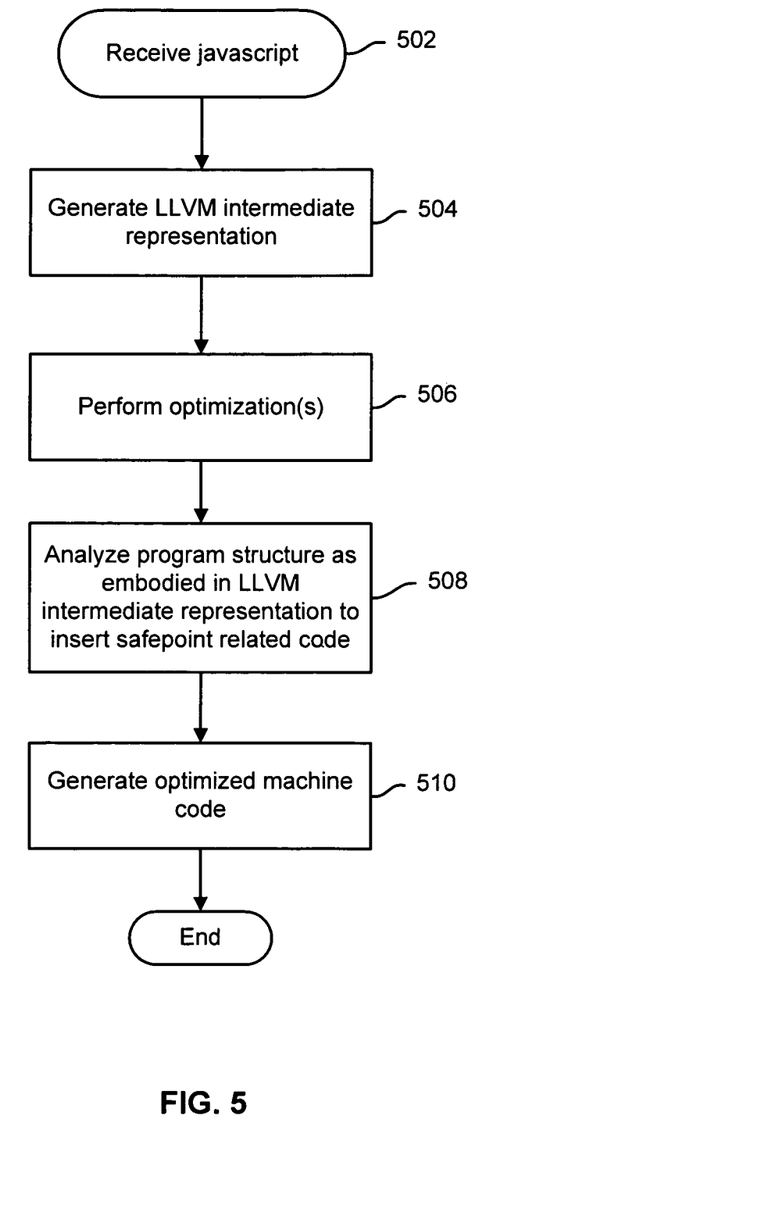
FIG. 5 is a flow diagram illustrating an embodiment of a process for compiling JavaScript code.

FIG. 5 is a flow diagram illustrating an embodiment of a process for compiling JavaScript code. In the example shown, received JavaScript code (502) is used to generate an LLVM IR representation of the JavaScript (504). One or more optimizations are performed on the LLVM IR (506). The optimized LLVM IR is processed to identify safepoints and insert safepoint related code (508). Once the safepoint related code has been inserted, the optimized LLVM IR is used to generate optimized machine code (510).

By deferring the insertion of safepoint related code until after one or more optimizations have been performed on an intermediate representation of a source code, such as JavaScript code or other code that does not already include safepoints for purposes of garbage collection, more highly optimized intermediate representation and consequently more highly optimized machine code can be created. In addition, delayed insertion of safepoint related code ensures such code is not removed, moved, or otherwise rendered inoperable or not properly operable during subsequent optimization processing.

Figure 6:
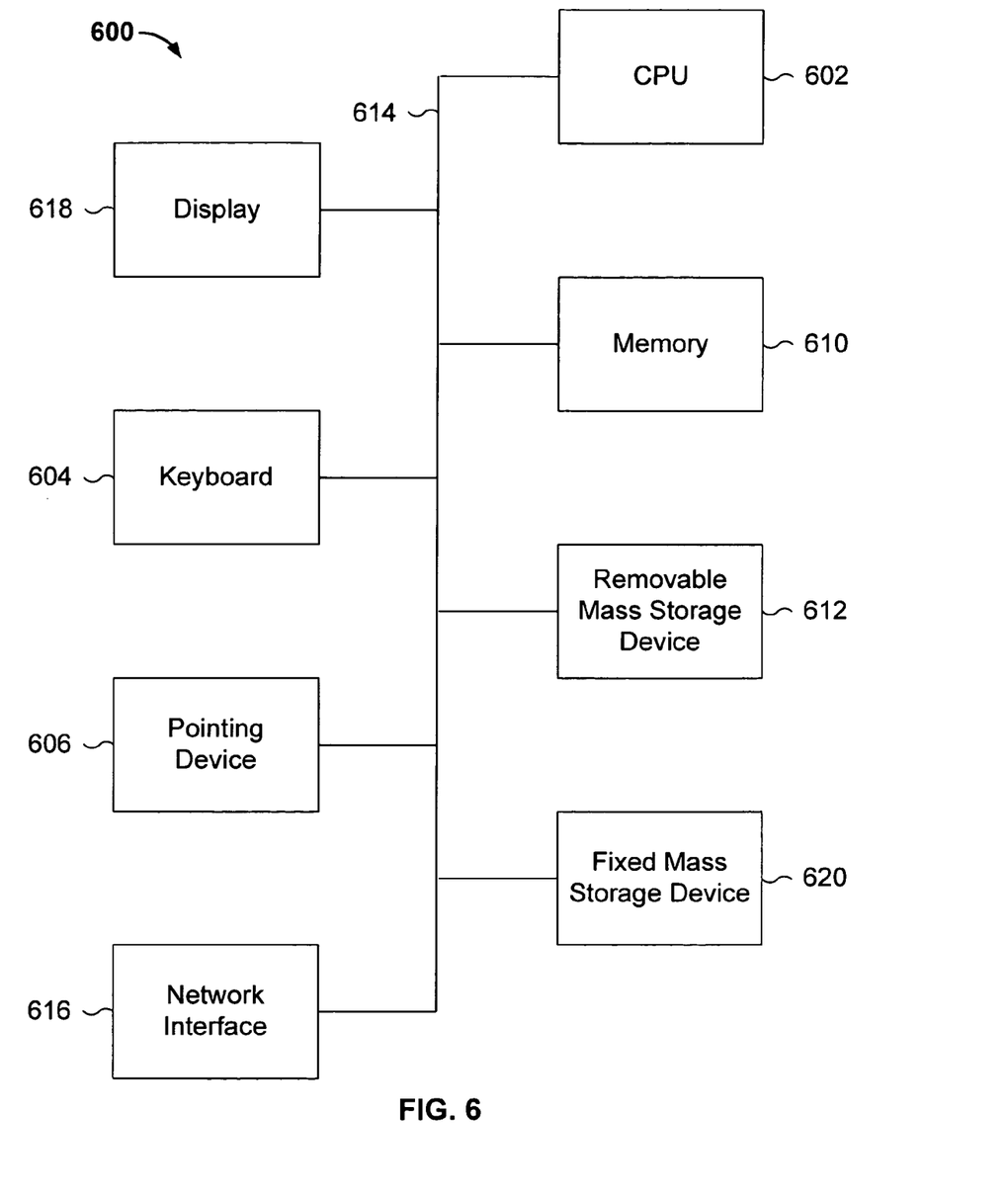
FIG. 6 is a block diagram of a computer system 600 used in some embodiments to compile JavaScript or other code.

FIG. 6 is a block diagram of a computer system 600 used in some embodiments to compile JavaScript or other code. FIG. 6 illustrates one embodiment of a general purpose computer system. Other computer system architectures and configurations can be used for carrying out the processing of the present invention. Computer system 600, made up of various subsystems described below, includes at least one microprocessor subsystem (also referred to as a central processing unit, or CPU) 602. That is, CPU 602 can be implemented by a single-chip processor or by multiple processors. In some embodiments CPU 602 is a general purpose digital processor which controls the operation of the computer system 600. Using instructions retrieved from memory 610, the CPU 602 controls the reception and manipulation of input data, and the output and display of data on output devices. In some embodiments, CPU 602 comprises and/or is used to provide the parser & compiler 304, compiler & optimizer 306, and/or machine code generator 308 of FIG. 3 and/or implements the processes of FIGS. 4 and/or 5.

CPU 602 is coupled bi-directionally with memory 610 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 602. Also as well known in the art, primary storage typically includes basic operating instructions, program code, data and objects used by the CPU 602 to perform its functions. Primary storage devices 610 may include any suitable computer-readable storage media, described below, depending on whether, for example, data access needs to be bi-directional or uni-directional. CPU 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to CPU 602. Storage 612 may also include computer-readable media such as magnetic tape, flash memory, signals embodied on a carrier wave, PC-CARDS, portable mass storage devices, holographic storage devices, and other storage devices. A fixed mass storage 620 can also provide additional data storage capacity. The most common example of mass storage 620 is a hard disk drive. Mass storage 612, 620 generally store additional programming instructions, data, and the like that typically are not in active use by the CPU 602. It will be appreciated that the information retained within mass storage 612, 620 may be incorporated, if needed, in standard fashion as part of primary storage 610 (e.g. RAM) as virtual memory.

In addition to providing CPU 602 access to storage subsystems, bus 614 can be used to provide access other subsystems and devices as well. In the described embodiment, these can include a display monitor 618, a network interface 616, a keyboard 604, and a pointing device 606, as well as an auxiliary input/output device interface, a sound card, speakers, and other subsystems as needed. The pointing device 606 may be a mouse, stylus, track ball, or tablet, and is useful for interacting with a graphical user interface.

The network interface 616 allows CPU 602 to be coupled to another computer, computer network, or telecommunications network using a network connection as shown. Through the network interface 616, it is contemplated that the CPU 602 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 602 can be used to connect the computer system 600 to an external network and transfer data according to standard protocols. That is, method embodiments of the present invention may execute solely upon CPU 602, or may be performed across a network such as the Internet, intranet networks, or local area networks, in conjunction with a remote CPU that shares a portion of the processing. Additional mass storage devices (not shown) may also be connected to CPU 602 through network interface 616.

An auxiliary I/O device interface (not shown) can be used in conjunction with computer system 600. The auxiliary I/O device interface can include general and customized interfaces that allow the CPU 602 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 6 is but an example of a computer system suitable for use with the invention. Other computer systems suitable for use with the invention may include additional or fewer subsystems. In addition, bus 614 is illustrative of any interconnection scheme serving to link the subsystems. Other computer architectures having different configurations of subsystems may also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing software code, comprising:
   receiving an intermediate representation of a source code, the intermediate representation generated at least in part by compiling the source code without identifying a safepoint;
   performing one or more optimizations on the intermediate code;
   identifying, subsequent to performing the one or more optimizations, one more safepoints in the optimized intermediate representation, wherein the safepoints are execution points at which garbage collection operations can be performed correctly;
   inserting safepoint related code associated with the safepoint into the optimized intermediate representation; and
   generating machine code based upon the optimized intermediate representation subsequent to inserting the safepoint related code.

2. The method of claim 1 further comprising receiving the source code.

3. The method of claim 1 further comprising using the source code to generate the intermediate representation.

4. The method of claim 3 wherein using the source code to generate the intermediate representation comprises using the source code to generate an initial intermediate representation.

5. The method of claim 1 wherein the intermediate representation comprises an LLVM intermediate representation (IR).

6. The method of claim 1 wherein the source code comprises JavaScript.

7. The method of claim 1 wherein identifying the one or more safepoints comprises statically analyzing the program structure of the source code to identify source code execution points where one or more requirements of garbage collection are satisfied.

8. The method of claim 1 wherein identifying the one or more safepoints comprises using variable type information embodied in the intermediate representation to identify a garbage collectible object.

9. The method of claim 7 wherein the one or more requirements comprise the source code not allocating new objects and not modifying existing objects.

10. A system for processing software code, comprising:
    a memory configured to store an intermediate representation of a source code; and
    a processor couple to the memory and configured to:
      receive an intermediate representation of a source code, the intermediate representation generated at least in part by compiling the source code without identifying a safepoint;
      perform one or more optimizations on the intermediate code;
      identify, subsequent to performing the one or more optimizations, one or more safepoints in the optimized intermediate representation, wherein the safepoints are execution points where garbage collection operations can be performed correctly;
      insert a safepoint related code associated with the safepoint into the optimized intermediate representation; and
      generate machine code based upon the optimized intermediate representation subsequent to inserting the safepoint related code.

11. The system of claim 10 wherein the processor is further configured to use the source code to generate the intermediate representation.

12. The system of claim 10 wherein the intermediate representation comprises an LLVM intermediate representation (IR).

13. The system of claim 10 wherein the source code comprises JavaScript.

14. The system of claim 10 wherein the processor is configured to identify the one or more safepoints at least in part by statically analyzing the program structure of the source code to identify source code execution points where one or more requirements of garbage collection are satisfied.

15. A computer program product for processing software code, the computer program product being embodied in a non-transitory computer readable storage medium and comprising computer instructions for:
   receiving an intermediate representation of a source code, the intermediate representation has been generated at least in part by compiling the source code without identifying a safepoint;
   performing one or more optimizations on the intermediate code;
   identifying, subsequent to performing the one or more optimizations, one or more safepoint in the optimized intermediate representation, wherein the safepoints are execution points at which garbage collection operations can be performed correctly;
   inserting safepoint related code associated with the safepoint into the optimized intermediate representation; and
   generating machine code based upon the optimized intermediate representation subsequent to inserting the safepoint related code.

16. The computer program product recited in claim 15 further comprising computer instructions for using the source code to generate the intermediate representation.

17. The computer program product recited in claim 15 wherein the intermediate representation comprises an LLVM intermediate representation (IR).

18. The computer program product recited in claim 15 wherein the source code comprises JavaScript.

19. The computer program product recited in claim 15 wherein identifying the one more safepoints comprises statically analyzing the program structure of the source code to identify source code execution points where one or more requirements of garbage collections are satisfied.

20. A system for processing software code, comprising:
   means for receiving an intermediate representation of a source code, the intermediate representation generated at least in part by compiling the source code without identifying a safepoint;
   means for performing one or more optimization on the intermediate code;
   means for identifying, subsequent to performing the one or more optimizations, one or more safepoints in the optimized intermediate representation, wherein the safepoints are execution points at which garbage collection operations can be performed correctly;
   means for inserting safe point related code associated with the safepoint into the optimized intermediate representation; and
   means for generating machine code based upon the optimized intermediate representation subsequent to inserting the safepoint related code.

* * * * *

UNITED STATES PATENT AND TRADEMARK OFFICE
CERTIFICATE OF CORRECTION

PATENT NO. : 8,826,253 B2  Page 1 of 1
APPLICATION NO. : 12/316729
DATED : September 2, 2014
INVENTOR(S) : Victor Leonel Hernandez Porras et al.

It is certified that error appears in the above-identified patent and that said Letters Patent is hereby corrected as shown below:

In the Claims:

Column 6, line 8 (Claim 1, line 7): "code;" should read --representation;--.
Column 6, line 10 (Claim 1, line 9): "one more" should read --one or more--.
Column 6, line 28 (Claim 5, line 2): "an LLVM" should read --a low level virtual machine (LLVM)--.
Column 6, line 47 (Claim 10, line 4): "couple" should read --coupled--.
Column 6, line 53 (Claim 10, line 10): "code;" should read --representation;--.
Column 7, line 2 (Claim 12, line 2): "an LLVM" should read --a low level virtual machine (LLVM)--.
Column 7, line 20 (Claim 15, line 10): "code;" should read --representation;--.
Column 7, line 22 (Claim 15, line 12): "safepoint" should read --safepoints--.
Column 8, line 5 (Claim 17, line 2): "an LLVM" should read --a low level virtual machine (LLVM)--.
Column 8, line 10 (Claim 19, line 2): "one more" should read --one or more--.
Column 8, line 11 (Claim 19, line 3): "the program" should read --a program--.
Column 8, line 19 (Claim 20, line 6): "optimization" should read --optimizations--.
Column 8, line 20 (Claim 20, line 7): "code;" should read --representation;--.
Column 8, line 26 (Claim 20, line 13): "safe point" should read --safepoint--.

Signed and Sealed this
Second Day of June, 2015

Michelle K. Lee
*Director of the United States Patent and Trademark Office*